(12) United States Patent
Sridharan et al.

(10) Patent No.: US 8,621,165 B1
(45) Date of Patent: Dec. 31, 2013

(54) METHOD AND APPARATUS FOR PROVIDING A VOLUME IMAGE BACKUP OF SELECTED OBJECTS

(75) Inventors: Srineet Sridharan, Pune (IN); Arindam Panna, Pune (IN)

(73) Assignee: Symantec Corporation, Mountain View, CA (US)

( * ) Notice: Subject to any disclaimer, the term of this patent is extended or adjusted under 35 U.S.C. 154(b) by 965 days.

(21) Appl. No.: 12/330,430

(22) Filed: Dec. 8, 2008

(51) Int. Cl.
*G06F 12/00* (2006.01)
*G06F 7/00* (2006.01)
*G06F 17/00* (2006.01)
*G06F 13/00* (2006.01)

(52) U.S. Cl.
USPC .......................... 711/162; 707/644; 707/649

(58) Field of Classification Search
None
See application file for complete search history.

(56) References Cited

U.S. PATENT DOCUMENTS

| | | | |
|---|---|---|---|
| 6,460,055 B1 * | 10/2002 | Midgley et al. | 707/640 |
| 7,308,547 B2 * | 12/2007 | Page et al. | 711/163 |
| 7,617,217 B1 * | 11/2009 | Chen et al. | 1/1 |
| 7,620,742 B2 * | 11/2009 | Kaushik et al. | 710/5 |
| 7,937,453 B1 * | 5/2011 | Hayden et al. | 709/219 |
| 7,979,690 B1 * | 7/2011 | Dyatlov et al. | 713/2 |
| 8,060,476 B1 * | 11/2011 | Afonso et al. | 707/649 |
| 2003/0005248 A1 * | 1/2003 | Selkirk et al. | 711/165 |
| 2003/0159007 A1 * | 8/2003 | Sawdon et al. | 711/154 |
| 2004/0139128 A1 * | 7/2004 | Becker et al. | 707/204 |
| 2005/0065986 A1 * | 3/2005 | Bixby et al. | 707/204 |
| 2005/0066118 A1 * | 3/2005 | Perry et al. | 711/112 |
| 2006/0112151 A1 * | 5/2006 | Manley et al. | 707/201 |
| 2006/0143362 A1 * | 6/2006 | Li et al. | 711/100 |
| 2007/0088702 A1 * | 4/2007 | Fridella et al. | 707/10 |

\* cited by examiner

*Primary Examiner* — Polina Peach
(74) *Attorney, Agent, or Firm* — Campbell Stephenson LLP

(57) ABSTRACT

A method and apparatus for providing a volume image backup of selected objects is provided. In one embodiment, a method for creating volume image backups using selected objects of a source volume, comprises processing metadata and mapping information regarding at least one object of a source volume, wherein the mapping information is used to identify at least one data block within the source volume for the at least one object, wherein the at least one object is selected from a plurality of objects configuring a file system hierarchy of at least one image file using the metadata and storing the at least one data block in the at least one image file using the mapping information.

20 Claims, 4 Drawing Sheets

METHOD AND APPARATUS FOR PROVIDING A VOLUME IMAGE BACKUP OF SELECTED OBJECTS

BACKGROUND

1. Field of the Invention

Embodiments of the present invention generally relate to backup techniques and, more particularly, to a method and apparatus for providing a volume image backup of selected objects.

2. Description of the Related Art

In a typical computing environment, various objects (e.g., data files such as documents, spreadsheets, presentations, structural designs and/or the like) are backed up to one or more storage devices (e.g., a tape drive, a hard disk drive and/or the like) on a regular basis. Generally, backups may be performed to protect the objects that store important, critical information. Regular backups prevent data loss and ensure uninterrupted productivity for the typical computing environment. As described further below, the various objects may be backed up and organized in a proprietary file format such as a volume image (backup) file format.

Volume image file formats are widely employed for full and incremental/delta backups due to a variety of reasons. For instance, disk-based full and/or incremental backups to volume image files are faster than file-by-file (i.e., brick) image files. Since each sector is read in sequential order, performing such a volume-based backup results in a reduction of hard disk seeks and file system query overhead. Furthermore, such incremental backups efficiently utilize changed data block tracking techniques to only copy data blocks that were modified since a previous backup instead of backing up an entire volume. Compared with file-by-file incremental backups, volume-based incremental backups are faster than backing up an entire file in cases where only a data block has changed. As another reason, volume image files are mountable and accessible as a volume (i.e., a drive letter) by various software programs. As yet another reason, the volume image files may be used as virtual disks by various virtual server applications. In addition, the volume image files permit random access of the data blocks; whereas, tape-based backup files only permit sequential access and therefore, lack enhanced functionality currently available with disk-based image backup files.

Generally, the volume image backup file is a block dump of a volume in a container format, such as .VHD, .VMDK, .V2I. Currently, a backup process is limited to an entire volume as opposed to selected objects (e.g., files and/or folders). For example, a user can only select the entire volume when creating the volume image backup file and cannot select individual files for a full and/or incremental backup. As such, each and every data block of a plurality of objects is copied to the volume image backup file. As a result, significant amounts of bandwidth and storage space are consumed unnecessarily. Furthermore, in a remote office scenario, the user may be interested in protecting only the critical data stored in the volume instead of the entire volume.

Therefore, there is a need in the art for a method and apparatus for providing a volume image backup of selected objects.

SUMMARY OF THE INVENTION

Embodiments of the present invention comprise a method and apparatus for providing a volume image backup of selected objects. In one embodiment, a method for creating volume image backups using selected objects of a source volume, comprises processing metadata and mapping information regarding at least one object of a source volume, wherein the mapping information is used to identify at least one data block within the source volume for the at least one object, wherein the at least one object is selected from a plurality of objects, configuring a file system hierarchy of at least one image file using the metadata and storing the at least one data block in the at least one image file using the mapping information.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
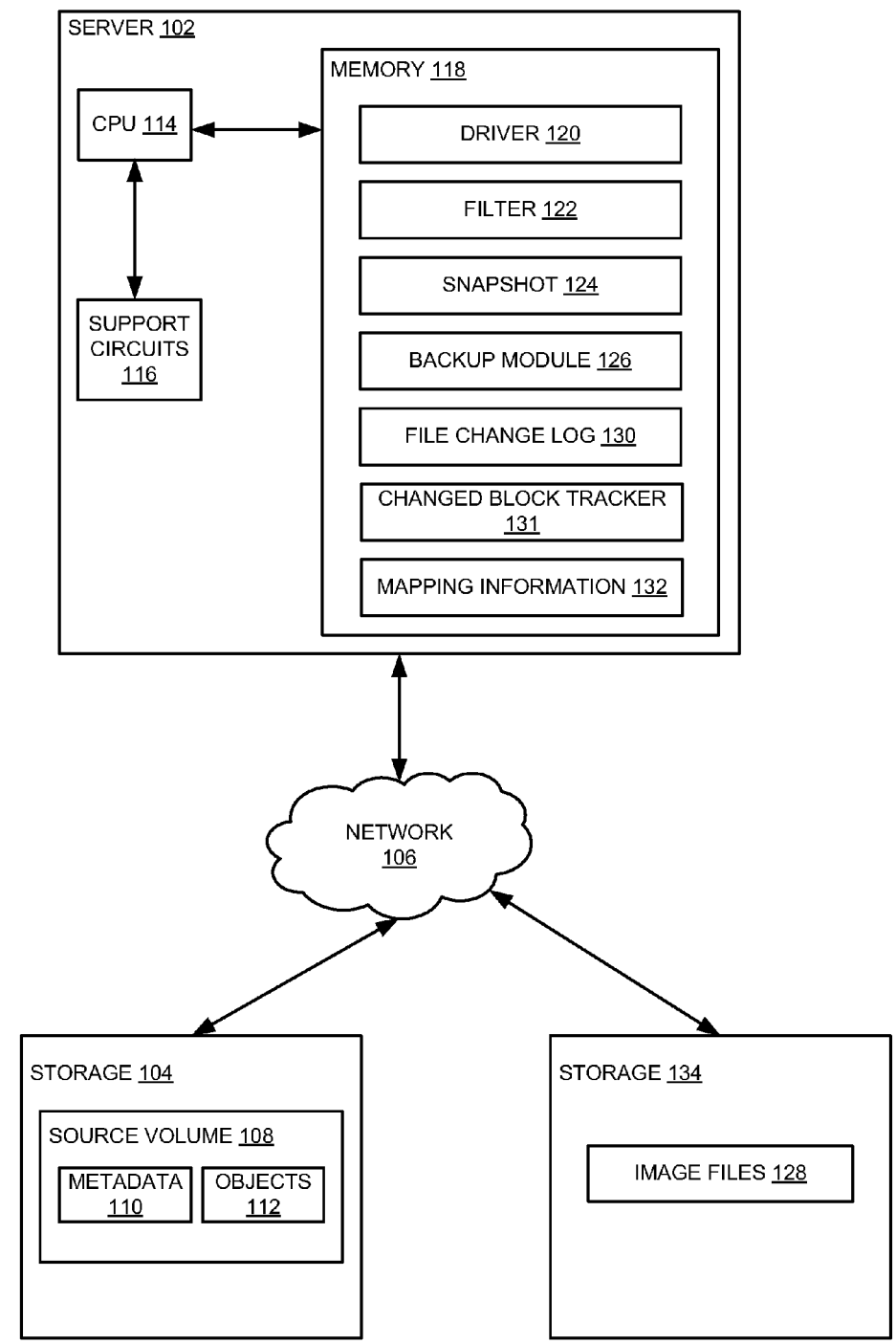
FIG. 1 is a block diagram of a system for providing a volume image backup of selected objects according to one or more embodiments of the present invention.

FIG. 1 is a block diagram of a system 100 for providing a volume image backup of selected objects according to various embodiments of the present invention. The system 100 comprises a server 102, storage 104 and storage 134 where each coupled to each other through a network 106.

The server 102 is a type of computing device (e.g., a laptop, a desktop, a Personal Digital Assistant (PDA) and/or the like), such as those generally known in the art. The server 102 includes a Central Processing Unit (CPU) 114, various support circuits 116 and a memory 118. The CPU 114 may comprise one or more commercially available microprocessors or microcontrollers that facilitate data processing and storage. The various support circuits 116 facilitate the operation of the CPU 114 and include one or more clock circuits, power supplies, cache, input/output circuits, and the like. The memory 118 comprises at least one of Read Only Memory (ROM), Random Access Memory (RAM), disk drive storage, optical storage, removable storage and/or the like. The memory 118 includes various data, such as a snapshot 124, a file change log 130, a changed block tracker 131 and mapping information 132. The memory 118 further includes various software packages, such as a driver 120, a filter 122 and a backup module 126.

The storage 104 and the storage 134 generally include various components (i.e., hardware and software) that are configured to manage storage resources within a computing environment. The storage 104 generally includes one or more data storage devices (e.g., hard disk drives, optical drives, magnetic tape drives and/or the like) and storage management software that provides an interface (e.g., Integrated Drive Electronics/AT Attachment (IDE/ATA), Small Computer Systems Interface (SCSI) and/or the like) to the one or more data storage devices for one or more computing devices, such as the server 102. The storage 104 and the storage 134 facilitate temporary and/or permanent storage (i.e., a backup) of critical computer data to backup media (e.g., sequential backup media (i.e., magnetic tape), optical storage media (e.g., hard disk) and/or the like).

In one embodiment, the storage 104 includes a backup of the source volume 108. The source volume 108 further includes metadata 110 and a plurality of objects of which one or more objects 112 are selected for the backup. The metadata 110 includes various information (i.e., attributes) associated with the objects 112, such as an Access Control List (ACL), a file size as well as time and date information for each modification, access, creation and/or the like. The objects 112 generally include one or more data items of various data types (e.g., emails, word documents, spreadsheets, aggregate data types (e.g., database files), and/or the like). In one or more embodiments, the objects 112 may include one or more files that are to be backed up to a destination, such as the image files 128 in the storage 134.

According to one or more embodiments, the objects 112 are arranged within the source volume 108 in accordance with a file system (e.g., MICROSOFT FAT32, NTFS, REDHAT LINUX, UNIX (UFS) and/or the like). As such, the source volume 108 includes file system information (e.g., File Allocation Table, Master File Table, (Node Table and/or the like) that specifies locations (i.e., offsets and/or addresses) of one or more data blocks of various sizes (i.e., extents) in which the objects 112 are stored. Hence, the mapping information 132 indicates one or more mappings between the one or more data blocks and the objects 112 according to one embodiment. As explained further below, the backup module 126 examines the file system information to determine such a mapping.

According to one embodiment, an extent may be a contiguous area of computer memory for storing a particular file. For example, an eight kilobyte (8 kB) cluster of a hard disk may be an extent that corresponds with a word document file. As such, four sectors in the storage 104 are allocated for storing data for the word document file. If the word document later exceeds eight kilobytes, then another extent having a size of eight kilobytes is provisioned to store data. Notably, the extent may be located at an offset of ten megabytes (10 mB) from sector zero (0). Furthermore, the another extent may be located at an offset of fifty megabytes (50 mB) and additionally, at an offset of eight kilobytes with respect to a beginning of the word document file. In other words, the extent and the another extent are each data blocks that correspond with the first eight kilobytes and the next eight kilobytes respectively. Moreover, the mapping information 132 includes such offset and size information regarding the extent and the another extent.

The network 106 comprises a communication system that connects computers by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the internet or intranet using various communications infrastructure such as Ethernet, WiFi, WiMax, General Packet Radio Service (GPRS), and the like.

According to various embodiments, the file change log 130 (e.g., a change journal) maintains information regarding input/output activity on the source volume 108 since a previous backup. In one embodiment, the file change log 130 records input/output activity associated with the objects 112. For example, the file change log 130 may record operations performed on the objects 112 while performing backup, such as a deletion, a modification, a renaming and/or the like. For example, the file change log 130 records each and every file system level operation (e.g., write, create, delete, rename and/or the like) on the source volume 108. The file change log 130 may be utilized to play one or more file system level metadata operations during incremental backups in order configure a file system hierarchy of an incremental/delta volume image file of the image files 128. Alternatively, if the file change log 130 is not available, the file system hierarchy may be configured by comparing a current file system hierarchy of the source volume 108 with a file system hierarchy of volume image file associated with the previous backup to determine one or more differences (i.e., one or more file system level metadata operations).

According to various embodiments, the changed block tracker 131 includes a bitmap/log that indicates each and every data block of the source volume 108 that is modified as of a previous point-of-time. In one embodiment, after the backup module 126 identifies a selected object (e.g., a file) that is changed or created, the backup module 126 accesses one or more mappings between the selected object and data blocks within the source volume 108. For example, the one or more mappings may be stored in a bitmap in which a flipped bit indicates a data block that corresponds with the selected object. Such a bitmap may be intersected with the changed block tracker 131 to determine which data blocks of the selected object changed. As a result, the backup module 126 only copies the changed data blocks from the source volume 108 to the image files 128. Alternatively, if the change block tracker 131 is not present on the server 102, then the backup module 126 copies each and every data block that corresponds with the changed and/or created selected object and/or identifies one or more changed data blocks within the selected object using various file version difference determination techniques.

According to various embodiments, the snapshot 124 is a point-in-time consistent image of the source volume 108. Various technologies (e.g., MICROSOFT Shadow Copy and/or the like) may be employed to generate the snapshot 124. In one or more embodiments, the snapshot 124 represents a point-in-time consistent copy of the data blocks within the source volume 108. The snapshot 124 may be generated for the source volume 108 to ensure point-in-time consistency for a copy of the source volume 108 regardless of any subsequent modification, addition and/or deletion of data. In one embodiment, the snapshot 124 indicates locations of data blocks that have changed and/or created since a previous point-in-time as well as locations of data blocks that have not changed and/or created.

The source volume 108 may be backed up to the image files 128 at various points-in-time (i.e., volume image backups, such as a volume image full backup, a volume image incremental backup, a volume image synthetic backup and/or the like). The image files 128 may be generated by an enterprise backup software (e.g., SYMANTEC NetBackup products, SYMANTEC BackupExec products and/or the like) to represent one or more storage states of a physical machine, a virtual machine, a hard disk drive and/or the like. In one embodiment, the source volume 108 is copied to the image files 128 in block order (i.e., a block dump of each and every data block). According to various embodiments, the image files 128 may be volume image files. Furthermore, the image files 128 may include one or more volume-level backup files, such as VMWARE Virtual Machine Disk backup (.VMDK), MICROSOFT Virtual Hard Drive backup (.VHD), a hard disk/partition backup, an image backup and/or the like, as well as one or more configuration files (e.g., .VWX for VMWARE).

According to various embodiments of the present invention, the backup module 126 generates one or more mappings between the objects 112 and one or more data blocks (i.e., extents) within the source volume 108. In one embodiment, the backup module 126 indicates that a data block for a particular file is located at a ten megabyte offset from a first sector of the source volume 108. In one embodiment, the backup module 126 utilizes one or more known mapping techniques (e.g., VERITAS Mapping Service (VxMS) and/or the like) to determine locations of data blocks that form the particular file, which are allocated in accordance with the file system employed at the source volume 108. Such mappings facilitate extraction of any data block that corresponds with the particular file from the source volume 108 by the driver 120 as explained below.

According to one or more embodiments, the driver 120 (i.e., a file system driver such as a NTFS file system driver) includes software code that recognizes a file system hierarchy of the objects 112 (e.g., file system objects such as data files) within the source volume 108. It is appreciated that the image files 128 may be empty image files when initially created. Furthermore, the driver 120 may utilize various Operating System (OS) function calls to create and open the image files 128 and/or the objects 112 such as Create File, Open File and the like. In one or more embodiments, the driver 120 writes the data blocks at an offset as read from the objects 112. For example, if the data block of a file is at an offset 1000 of the source volume 108, then the data block is written at an offset 1000 of a corresponding file in a destination volume (e.g., virtual volume) included within a particular image file of the image files 128.

According to one or more embodiments, the driver 120 accesses one or more full and/or incremental backups (i.e., a backup chain) by synthesizing a full backup from the image files 128. Such a synthesized backup may be consistent with a point-in-time of interest, such as a current point-in-time. In one embodiment, the driver 120 merges various information (e.g., metadata, file system hierarchy and/or the like) from each image file of the image files 128 associated with the one or more full and/or incremental backups. For example, the driver 120 processes each incremental backup in reverse chronological order until a base full backup in order to create the synthesized backup. As such, the driver 120 retains current data blocks and metadata in the synthesized backup. Consequently, the driver 120 may mount one or more image files for the synthesized backup to read and/or restore one or more data blocks.

According to one or more embodiments, the backup module 126 creates the image files 128 of which the driver 120 mounts in order to perform various operations, such as configuring a file system hierarchy and/or writing data. Initially, the image files 128 are configured with necessary volume information and the file system hierarchy and represent a valid volume without actual user files and directories. In one embodiment, the backup module 126 uses the driver 120 to create one or more corresponding files and directories within the image files 128 that correspond with the file system hierarchy and the metadata 110 of the source volume 108. Hence, the backup module 126 provisions the image files 128 with a destination volume. In one embodiment, the backup module 126 uses the driver 120 to allocate storage space for the one or more files and directories based upon the mapping information 132. Basically, the backup module 126 configures the file system hierarchy to create a destination volume within the image files 128 for storing selected objects (e.g., selected files and/or folders) of the objects 112 according to one or more embodiments.

In operation, the backup module 126 processes the mapping information 132 to optimize a volume-based backup of selected objects of the objects 112 and reduce overhead (e.g., disk seek overhead, file system query overhead and/or the like). Consequently, the volume-based backup (i.e., the image files 128) of the selected objects may be mounted by various software programs. For example, data protection software may perform various backup and recovery operations using the volume-based backup. In one embodiment, the image files 128 may be mounted and assigned a driver letter through which the selected objects. In another embodiment, the image files 128 may be used as virtual disks for various virtual server applications. Furthermore, because the image files 128 are stored on disk and not magnetic tape, the selected objects may be accessed randomly instead of sequentially. Hence, the backup module 126 creates the image files 128 to be optimal for selected object extraction.

In one embodiment, the backup module 126 sorts the mapping information 132 based on data block locations of the objects 112. For example, the backup module 126 arranges mappings between data blocks (i.e., extents) and files by sector number within the source volume 108. Hence, the data blocks may be read from the source volume 108 in sector order instead of file order. It is appreciated that the data blocks may be read in file order in accordance with various embodiments. In one embodiment, the backup module 126 utilizes the driver 120 to write the data blocks to the corresponding offsets of the corresponding objects within the destination volume within the image files 128. In one or more embodiments, the driver 120 may invoke various functions of a file system Application Programming Interface (API) to perform such write operations.

According to various embodiments of the present invention, the backup module 126 utilizes the filter 122 (e.g., a virtual file filter) to capture each and every write operation before being applied to the image files 128. In one embodiment, the filter 122 stores one or more modified data blocks in a separate volume image file (e.g., an incremental backup/delta volume image file) of the image files 128. For example, if data protection software (e.g., True Capture based continuous data protection) at the storage 104 performs write operations on the image files 128, then the filter 122 captures and redirects the write operations to an incremental/delta backup volume image file. As such, various file system level operations (e.g., delete directory, rename directory, move file and/or the like) may be performed in between two or more points-in-time. According to various embodiments, the backup module 126 may examine the file change log 130 to identify one or more file system level operations performed on the metadata 110 of the source volume 108. Alternatively, the backup module 126 compares file system hierarchies between the source volume 108 and a destination volume within the image files 128 to identify one or more differences if the file change log 130 is unavailable.

As an example and not as a limitation, the backup module 126 may instruct the driver 120 to mount the source volume 108 to select and access one or more objects of the objects 112. In one embodiment, the driver 120 generates the snapshot 124. In one embodiment, the backup module 126 may utilize the changed block tracker 131 (i.e., a technique designed to monitor modifications to the source volume 108) to identify one or more modified and/or added data blocks. Alternatively, the driver 120 may utilize archive bits to identify the one or more changed and/or created objects (e.g., files). For example, the driver 120 sets an archive bit when a data block for a file is modified and/or added. Once the changed file is successfully backed up, the backup module 126 resets the archive bit. In one alternative embodiment, the driver 120 utilizes the archive bits if the changed block tracker 131 is not available. In another alternative embodiment, the driver 120 may utilize the metadata 110 to identify the one or more modified and/or added data blocks. For example, the backup module 126 may compare time and date information regarding modifications to the selected objects to identify whether any object of the selected objects changed since a previous point-in-time (e.g., a previous backup of the source volume 108).

Figure 2:
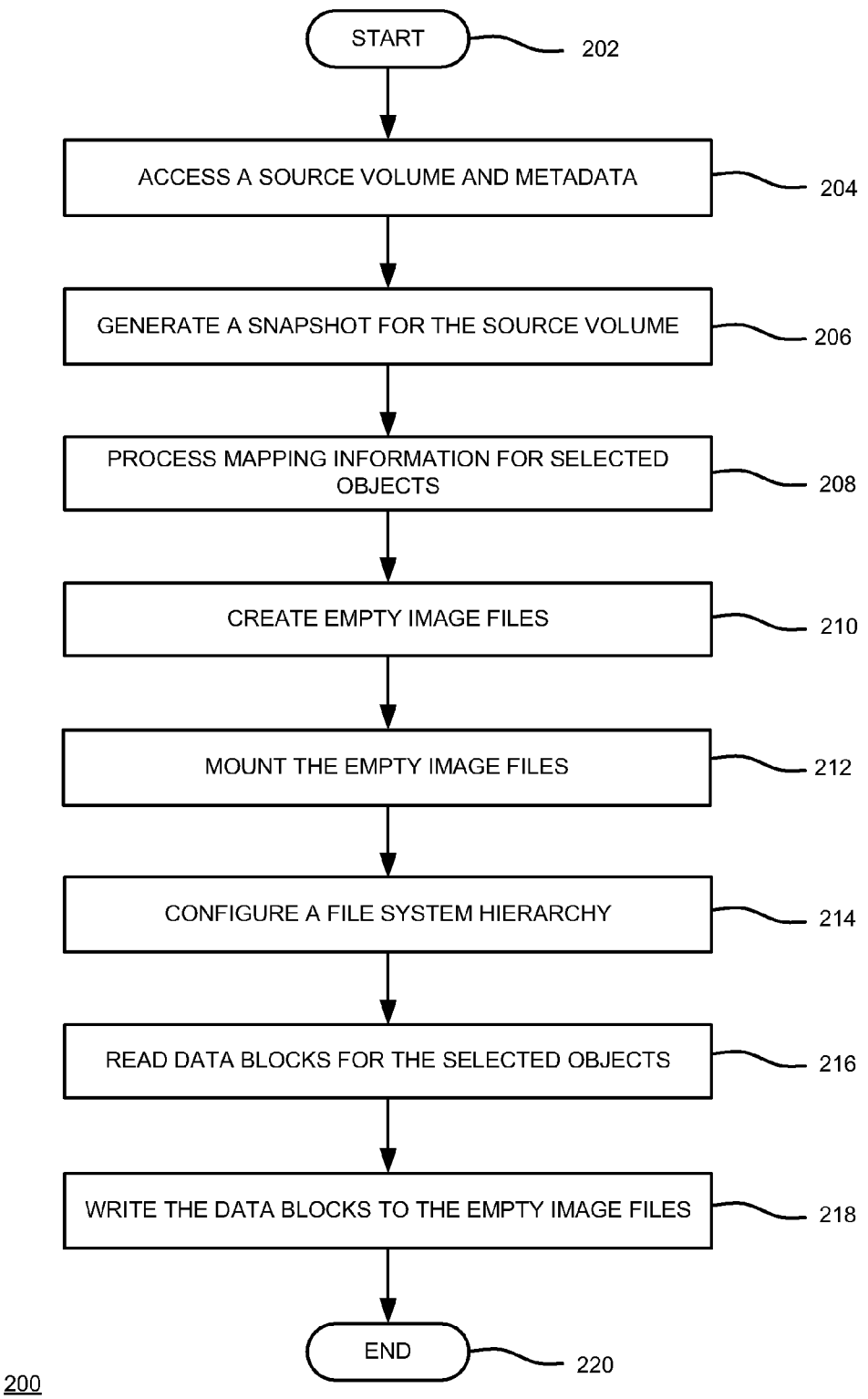
FIG. 2 is a flow diagram of a method for providing a volume image full backup of selected objects according to one or more embodiments of the present invention.

FIG. 2 is a flow diagram of a method 200 for providing a volume image full backup of selected objects according to one embodiment of the present invention. The method 200 starts at step 202 and proceeds to step 204, at which a source volume (e.g., the source volume 108 of FIG. 1) and metadata (e.g., the metadata 110 of FIG. 1) are accessed.

At step 206, a snapshot (e.g., the snapshot 124 of FIG. 1) is generated for the source volume. At step 208, mapping information (e.g., the mapping information 132 of FIG. 1) is processed for selected objects (e.g., selected ones of the objects 112 of FIG. 1). At step 210, one or more empty image files (e.g., the image files 128 of FIG. 1) are created. At step 212, the one or more empty image files are mounted. At step 214, a file system hierarchy for the one or more empty image files is configured. At step 216, one or more data blocks for the selected objects are read from the source volume in sector order. At step 218, the one or more data blocks are written to the one or more empty image files. At step 220, the method 200 ends.

Figure 3:
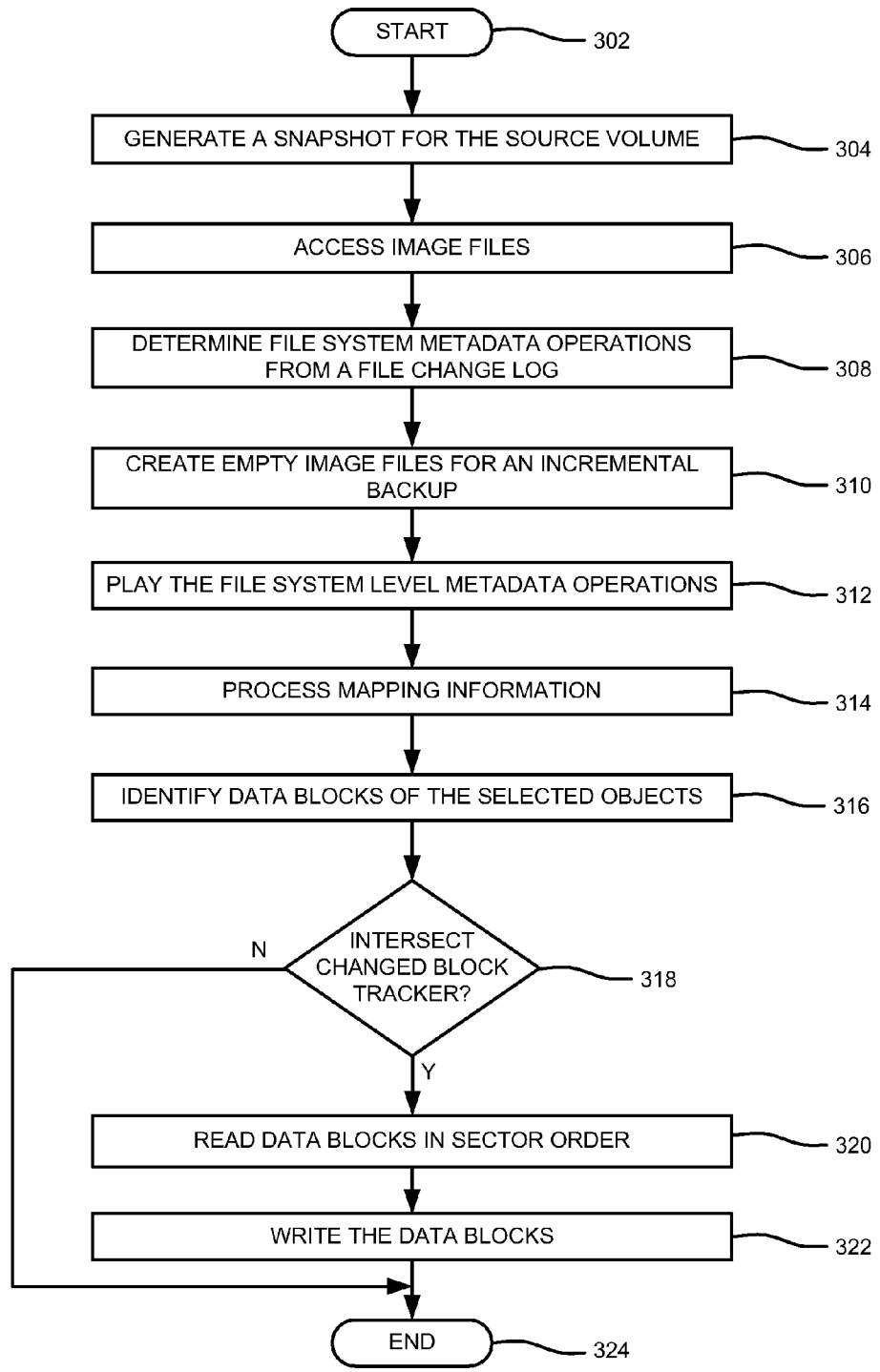
FIG. 3 is a flow diagram of a method for providing a volume image incremental backup of selected objects according to one or more embodiments of the present invention.

FIG. 3 is a flow diagram of a method 300 for providing a volume image incremental backup of selected objects according to one embodiment of the present invention. The method 300 starts at step 302 and proceeds to step 304, at which a snapshot (e.g., the snapshot 124 of FIG. 1) is generated for a source volume (e.g., the source volume 108 of FIG. 1).

At step 306, image files are accessed. At step 308, one or more file system metadata operations performed at a source volume are determined from a file change log (e.g., the file change log 130 of FIG. 1). In one embodiment, the one or more file system metadata operations correspond with one or more selected objects and/or any parent/ancestor directories. At step 310, one or more empty image files (e.g., the image files 128 of FIG. 1) for an incremental backup are created. At step 312, the one or more file system level metadata operations are played on a destination volume within the one or more empty image files. As explained above, the one or more file system level metadata operations are captured by a virtual file filter and redirected to the one or more empty image files to which such operations are applied according to one embodiment.

At step 314, the mapping information is processed. At step 316, data blocks (i.e., extents) for the selected objects are identified. At step 318, a determination is made as to whether any of the data blocks of the selected objects intersect a changed block tracker (e.g., the changed block tracker 131 of FIG. 1). If it is determined that one or more data blocks of the selected objects intersect the changed block tracker (option "YES"), then the method 300 proceeds to step 320. At step 320, the one or more data blocks are read from the source volume in sector order (e.g., increasing sector order).

At step 322, the one or more data blocks are written to corresponding offsets of corresponding files in a destination volume within the one or more empty image files. As explained above, a file system driver (e.g., the driver 120 of FIG. 1) attempts to write the data blocks to the image files; however, a virtual file filter (the filter 122 of FIG. 1) captures and redirects each and every write operation to the one or more empty image files for the incremental backup. Subsequently, the method 300 proceeds to step 324. If, at step 318, it is determined that no data block of the selected objects intersects the changed block tracker (option "NO"), then the method 300 proceeds to step 324. At step 324, the method 300 ends.

Figure 4:
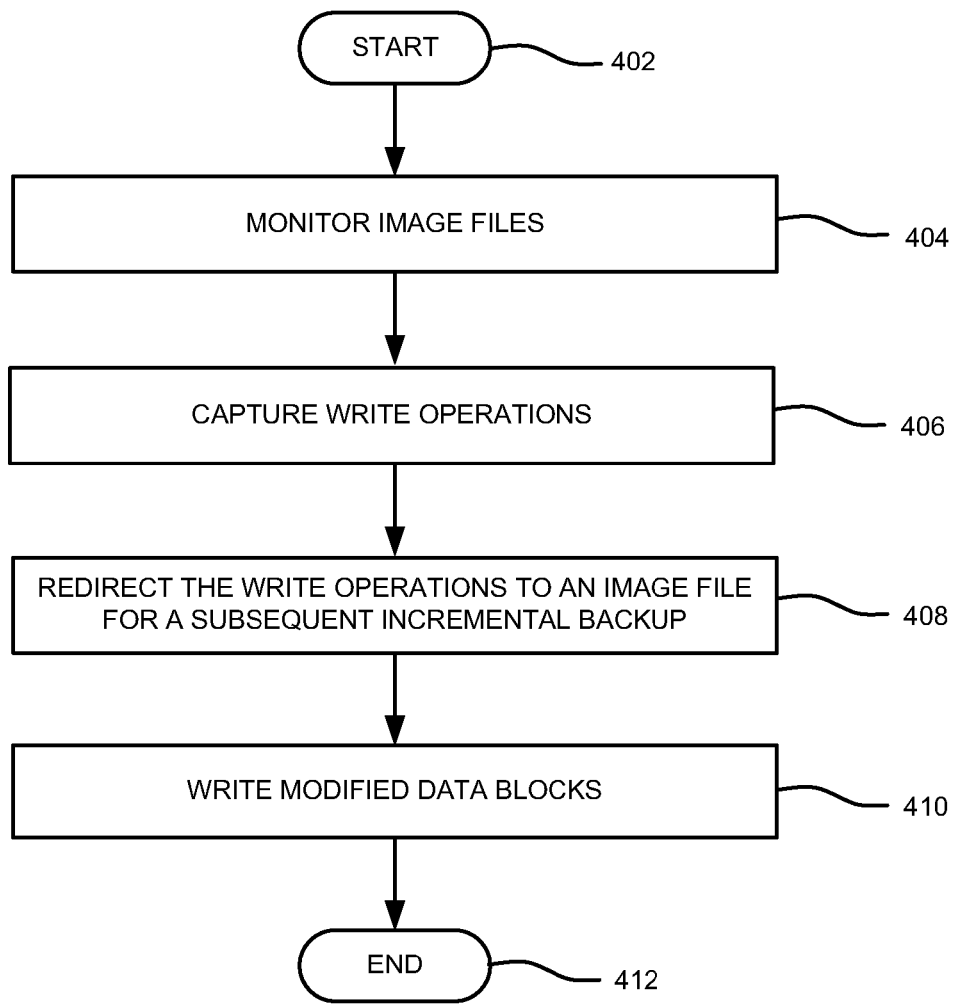
FIG. 4 is a flow diagram of a method for filtering write operations from the source volume according to one or more embodiments of the present invention.

FIG. 4 is a flow diagram of a method 400 for filtering write operations from image files according to one embodiment of the present invention. In one embodiment, the image files form a full backup and/or one or more incremental backups of a source volume at one or more point-in-times. In another embodiment, the method 400 may be performed by a virtual file filter (e.g., the filter 122 of FIG. 1). The method 400 starts at step 402 and proceeds to step 404, at which the image files are monitored.

At step 406, write operations to the image files are captured. At step 408, the write operations are redirected to an image file for a subsequent incremental backup. At step 410, modified data blocks are written to the image file for the subsequent incremental backup in accordance with the write operations. For example, any data block modified or added as of a previous point-in-time is written to the image file for the subsequent incremental backup. At step 412, the method 400 ends.

While the foregoing is directed to embodiments of the present invention, other and further embodiments of the invention may be devised without departing from the basic scope thereof, and the scope thereof is determined by the claims that follow.

The invention claimed is:

1. A method for providing a volume image backup, comprising:
   accessing, using one or more processors, metadata, a changed block information, and mapping information, for at least one object of a source volume, wherein
      the source volume comprises a plurality of data blocks,
      the mapping information identifies at least one data block that stores at least a portion of the at least one object,
      the changed block information indicates one or more of the plurality of data blocks that have changed since a previous backup of the source volume,
      the metadata comprises information regarding a source file system hierarchy of the source volume, and
      the at least one object is selected from a plurality of objects that are arranged using the source file system hierarchy;
   allocating at least one image file for the at least one selected object;
   determining that the at least one object is changed in the source volume;
   in response to the determining, identifying the at least one data block, wherein
      the identifying is performed using the mapping information, and
      the identifying comprises comparing the mapping information with the changed block information to identify the at least one data block;
   configuring a destination file system hierarchy within the at least one image file using the metadata, wherein
      the destination file system hierarchy is configured to reflect the source file system hierarchy with respect to the at least one object; and
   initiating a write operation, wherein the write operation is configured to write a copy of the at least one data block for the at least one object in the at least one image file, the initiating is performed using the mapping information and in accordance with the destination file system hierarchy, a virtual file filter is configured to capture the write operation prior to applying the write operation to the at least one image file, and the virtual file filter is further configured to redirect the write operation to an incremental image file, wherein the incremental image file indicates changes to the at least one image file.

2. The method of claim 1, wherein configuring the destination file system hierarchy comprises creating the at least one image file, wherein the at least one image file comprises a destination volume.

3. The method of claim 1, wherein configuring the destination file system hierarchy comprises:

mounting the at least one image file to access a file system application programming interface; and allocating storage space within the at least one image file for the at least one object using the file system application programming interface.

4. The method of claim 1, wherein the at least one data block is to be backed-up in response to the identifying.

5. The method of claim 1, further comprising sorting the mapping information, wherein at least one offset of the at least one data block is arranged using sector order, and reading at least some of the plurality of data blocks from the source volume in sector-order, wherein the at least some of the plurality of data blocks comprise the at least one data block, and the reading the at least some of the plurality of data blocks from the source volume is performed using the sector order for the at least some of the plurality of data blocks.

6. The method of claim 1, wherein the plurality of data blocks comprises a first and second subset, the first subset includes the least some of the plurality of data blocks, the storing the copy of the at least one data block comprises performing the storing only for the first subset and not for the second subset of the plurality of blocks.

7. The method of claim 1, wherein storing the copy of the at least one data block comprises writing the at least one data block using at least one corresponding offset in the at least one image file, wherein the at least one corresponding offset is based on an offset of the at least one data block in the source volume.

8. The method of claim 1, wherein the mapping information comprises at least one mapping between the at least one data block of the source volume and the at least one object, and each data block of the at least one data block is located at an offset within the source volume.

9. The method of claim 1, wherein processing the metadata and the mapping information comprises selecting the at least one object from a plurality of objects in the source volume, wherein the storing the copy of the at least one data block comprises performing the storing only for the at least one data block associated with the at least one selected object.

10. The method of claim 1, wherein configuring the destination file system hierarchy comprises creating the copy of the at least one object and at least one directory within the at least one image file.

11. The method of claim 1, wherein configuring the destination file system hierarchy comprises accessing a file change log to determine at least one file system level metadata operation that is to be performed on the source volume.

12. The method of claim 1, wherein configuring the destination file system hierarchy comprises comparing the source file system hierarchy with the destination file system hierarchy of an image file of the at least one image files that is associated with a previous point-in-time to determine at least one file system level metadata operation.

13. The method of claim 1, wherein configuring the destination file system hierarchy comprises applying at least one file system level metadata operation to the at least one image file.

14. The method of claim 1, wherein the at least one write operation is associated with the storing of the copy of the at least one data block.

15. An apparatus for providing a volume image backup, comprising:

one or more processors;

a driver, executable by the one or more processors, for accessing metadata and mapping information for at least one object of a source volume, wherein the source volume comprises a plurality of data blocks, the mapping information identifies the at least one data block that stores at least a portion of the at least one object, the changed block information indicates one or more of the plurality of data blocks that have changed since a previous backup of the source volume, the metadata comprises information regarding a source file system hierarchy of the source volume, and the at least one object is selected from a plurality of objects that are arranged using the source file system hierarchy; and a backup module coupled to the driver for processing the metadata and the mapping information, wherein the backup module is configured to allocate at least one image file for the at least one selected object, determine that the at least one object is changed in the source volume, in response to a determination, identify the at least one data block, wherein the backup module is configured to perform the identification using the mapping information, and the backup module is configured to perform the identification by comparing the mapping information with the changed block information to identify the at least one data block, configure a destination file system hierarchy of the at least one image file using the metadata, wherein the backup module is configured to configure the destination file system hierarchy to reflect the source file system hierarchy with respect to the at least one object, and initiate a write operation, wherein the write operation is configured to write a copy of the at least one data block for the at least one object in the at least one image file, the backup module is configured to perform the initiation using the mapping information and in accordance with the destination file system hierarchy, a virtual file filter is configured to capture the write operation prior to applying the write operation on the at least one image file, and the virtual file filter is further configured to redirect the write operation to an incremental image file, wherein the incremental image file indicates changes to the at least one image file.

16. The apparatus of claim 15, wherein the backup module is configured to back-up the at least one data block in response to the identification.

17. The apparatus of claim 15, wherein the backup module is further configured to sort the mapping information, wherein at least one offset of the at least one data block is arranged using sector order, and read at least some of the plurality of data blocks from the source volume in sector-order, wherein the at least some of the plurality of data blocks comprise the at least one data block, and the backup module performs the reading the at least some of the plurality of data blocks from the source volume using the sector order for the at least some of the plurality of data blocks.

18. The apparatus of claim 17, wherein the backup module is configured to write the copy of the at least one data block using at least one corresponding offset in the at least one image file, wherein the at least one corresponding offset is based on an offset of the at least one data block in the source volume.

19. A system for creating volume image backups using selected objects of a source volume, comprising:

storage, comprising:

a source volume that comprises a plurality of objects and a plurality of data blocks; and a backup server coupled to the storage, comprising:

a driver for accessing metadata a changed block information, and mapping information for at least one object that is selected from the plurality of objects, wherein the mapping information identifies the at least one data block that stores at least a portion of the at least one object, the changed block information indicates one or more of the plurality of data blocks that have changed since a previous backup of the source volume, the metadata comprises information regarding a source file system hierarchy of the source volume, and the at least one object is selected from a plurality of objects that are arranged using the source file system hierarchy, and a backup module coupled to the driver for processing the metadata and the mapping information, wherein the backup module is configured to configure a destination file system hierarchy for the at least one object of at least one image file, allocate at least one image file, wherein the at least one image file is configured to store one or more data blocks of the at least one selected object, determine that the at least one object is changed in the source volume, in response to the determining, identify the at least one data block, wherein the backup module is configured to perform the identification using the mapping information, and the backup module is configured to perform the identification by comparing the mapping information with the changed block information to identify the at least one data block, initiate a write operation, wherein the write operation is configured to write a copy of the at least one data block for the at least one object in the at least one image file, the backup module is configured to perform the initiation using the mapping information and in accordance with the destination file system hierarchy, a virtual file filter is configured to capture the write operation prior to applying the write operation on the at least one image file, and the virtual file filter is further configured to redirect the write operation to an incremental image file, wherein the incremental image file indicates changes to the at least one image file.

20. The system of claim 19, wherein the backup module is configured to back-up the at least one data block in response to the identification.

* * * * *